(12) United States Patent
Ritland et al.

(10) Patent No.: US 9,746,185 B2
(45) Date of Patent: Aug. 29, 2017

(54) CIRCUMFERENTIAL BIASING AND PROFILING OF FUEL INJECTION IN DISTRIBUTION RING

(75) Inventors: David M. Ritland, Winter Park, FL (US); Timothy A. Fox, Hamilton (CA)

(73) Assignee: SIEMENS ENERGY, INC., Orlando, FL (US)

(*) Notice: Subject to any disclaimer, the term of this patent is extended or adjusted under 35 U.S.C. 154(b) by 2281 days.

(21) Appl. No.: 12/712,522

(22) Filed: Feb. 25, 2010

(65) Prior Publication Data

US 2011/0203284 A1 Aug. 25, 2011

(51) Int. Cl.
*F02C 7/22* (2006.01)
*F23R 3/28* (2006.01)

(52) U.S. Cl.
CPC .............. *F23R 3/286* (2013.01); *F02C 7/22* (2013.01)

(58) Field of Classification Search
USPC .................. 60/734, 737, 739, 740, 742, 760
See application file for complete search history.

(56) References Cited

U.S. PATENT DOCUMENTS

| | | | | |
|---|---|---|---|---|
| 6,109,038 A * | 8/2000 | Sharifi et al. | | 60/737 |
| 6,189,321 B1 * | 2/2001 | Banhardt et al. | | 60/739 |
| 6,282,904 B1 * | 9/2001 | Kraft et al. | | 60/739 |
| 6,370,863 B2 * | 4/2002 | Muller et al. | | 60/776 |
| 6,487,860 B2 * | 12/2002 | Mayersky et al. | | 60/739 |
| 6,530,222 B2 * | 3/2003 | Stuttaford et al. | | 60/737 |
| 6,868,676 B1 * | 3/2005 | Haynes | | 60/776 |
| 6,945,053 B2 | 9/2005 | Von Der Bank | | |
| 7,028,484 B2 * | 4/2006 | Prociw et al. | | 60/772 |
| 7,249,461 B2 | 7/2007 | Moraes | | |
| 7,249,721 B2 * | 7/2007 | Niass et al. | | 239/399 |
| 7,506,511 B2 * | 3/2009 | Zupanc et al. | | 60/746 |
| 7,530,231 B2 * | 5/2009 | Prociw et al. | | 60/740 |
| 7,533,531 B2 * | 5/2009 | Prociw et al. | | 60/739 |
| 7,559,142 B2 * | 7/2009 | Patel et al. | | 29/889.2 |
| 7,559,201 B2 * | 7/2009 | Prociw et al. | | 60/739 |
| 7,565,807 B2 * | 7/2009 | Prociw et al. | | 60/799 |
| 7,607,226 B2 * | 10/2009 | Patel et al. | | 29/890.08 |
| 7,654,088 B2 * | 2/2010 | Shafique et al. | | 60/739 |
| 2008/0267783 A1 | 10/2008 | Kraemer et al. | | |

\* cited by examiner

*Primary Examiner* — Ehud Gartenberg
*Assistant Examiner* — Thomas Burke (57) ABSTRACT

An annular fluid distribution device (20) for distributing fluid into a gaseous flow (14), that includes: a first fluid distribution manifold (30) having a first fluid inlet and first fluid outlets (24), wherein the first fluid outlets inject a first fluid into the gaseous flow; and a second fluid distribution manifold (32), having a second fluid inlet and second fluid outlets (26), wherein the second fluid outlets inject a second fluid into the gaseous flow. The second fluid manifold is isolated from the first fluid distribution manifold, and the first fluid outlets and the second fluid outlets are disposed on a common fluid outlet plane (43).

20 Claims, 5 Drawing Sheets

CIRCUMFERENTIAL BIASING AND PROFILING OF FUEL INJECTION IN DISTRIBUTION RING

FIELD OF THE INVENTION

This invention relates in general to turbine engines, and, more particularly, to a turbine fluid distribution ring for injecting fluid into a gaseous fluid flow in a manner that permits control of the fluid profile within the gaseous fluid in both the circumferential and radial directions.

BACKGROUND OF THE INVENTION

Environmental regulations may limit the amount of NOx emitted from turbine engines. One known manner for reducing NOx emissions is to mix the compressed air used for combustion with fuel before the air enters the primary combustion zone. Such premixed fuel burns cleaner than combustion fuel that is not premixed so as to reduce the amount of NOx generated. In addition to the NOx reduction benefit, premixed combustion air can assist in the management of the dynamic forces during combustion. In particular, when the primary combustion zone is provided with a air/fuel premixture, a more stable, controlled and predictable combustion occurs. As a result, the potential for high frequency acoustic combustion forces and their associated dangers are minimized.

Figure 1:
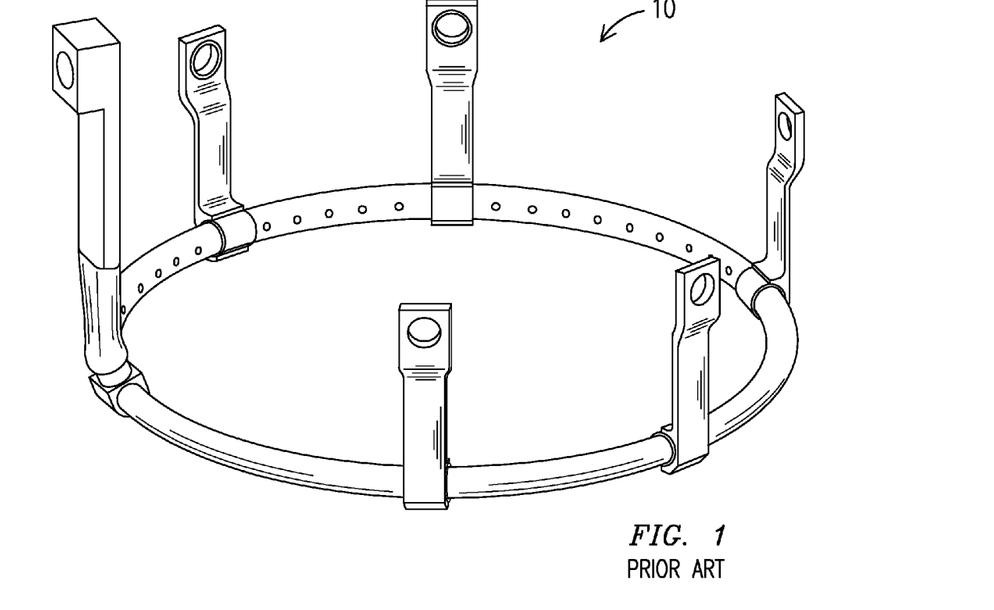
FIG. 1 is an isometric view of a prior art fuel ring assembly.
Figure 2:
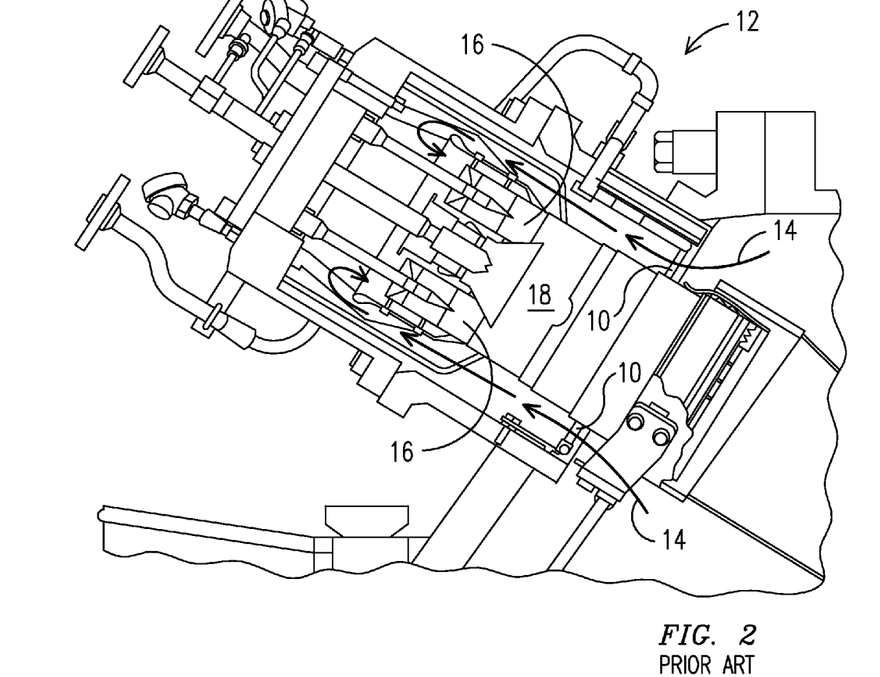
FIG. 2 is a cross-sectional view of the combustor section of a turbine engine showing the position of a fuel ring assembly.

A fuel injector assembly can be provided for distributing fuel into the compressed air flow upstream of the main combustor portion of the turbine. In one prior design, fuel is injected into the compressed air stream using a ring-type assembly as shown in FIG. 1. Such a fuel ring may be disposed within a turbine combustor at a location upstream in the gaseous fluid (i.e. airflow) from combustor burners, as shown in FIG. 2. While such fuel rings have permitted improved control of NOx production and dynamic forces when compared to earlier systems, the fuel rings permit only minimal control of the fuel profile within the gaseous fluid flow.

BRIEF DESCRIPTION OF THE DRAWINGS

The invention is explained in the following description in view of the drawings that show.

DETAILED DESCRIPTION OF THE INVENTION

The inventors of the present invention have innovatively conceived of a structure that will permit greater control of the profile of a liquid injected into a gaseous fluid flow by permitting adjustment of the fuel both in the radial direction and in a circumferential direction, in order to reduce NOx emissions and combustion dynamics.

FIG. 1 is a fuel ring 10 as known in the art. FIG. 2 shows the position of the fuel ring 10 of FIG. 1 in the combustor section 12 of a turbine engine. Arrows 14 depict the flow of gaseous fluid, typically compressed air, as it flows past the fuel ring 10, reverses path and flows through burners 16 prior to entering a combustion chamber 18.

Figure 3:
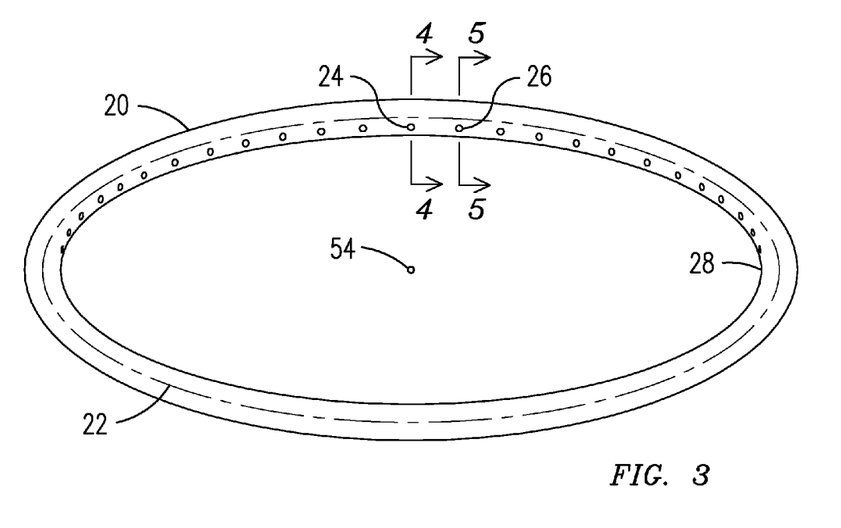
FIG. 3 is an isometric view of an annular fluid distribution device.

FIG. 3 is a view of an improved annular fluid distribution device 20, and a characteristic annular axis 22 of the annular fluid distribution device 20. The annular fluid distribution device 20 could be located in the combustor section 12 of a turbine engine in a manner similar to the fuel rings of the prior art. Attachment legs are known to those of ordinary skill in the art, as are ways to connect fluid supply lines to the fluid distribution device. For sake of clarity these are not shown. The annular distribution device includes first fluid outlet 24 and second fluid outlet 26. These fluid outlets, 24, 26, are the openings through the outer surface 28 of the annular fluid distribution device 20. It can be seen in this embodiment that there are several fluid outlets, 24, 26, and these outlets are through the surface toward the interior of the annular distribution device.

Figure 4:
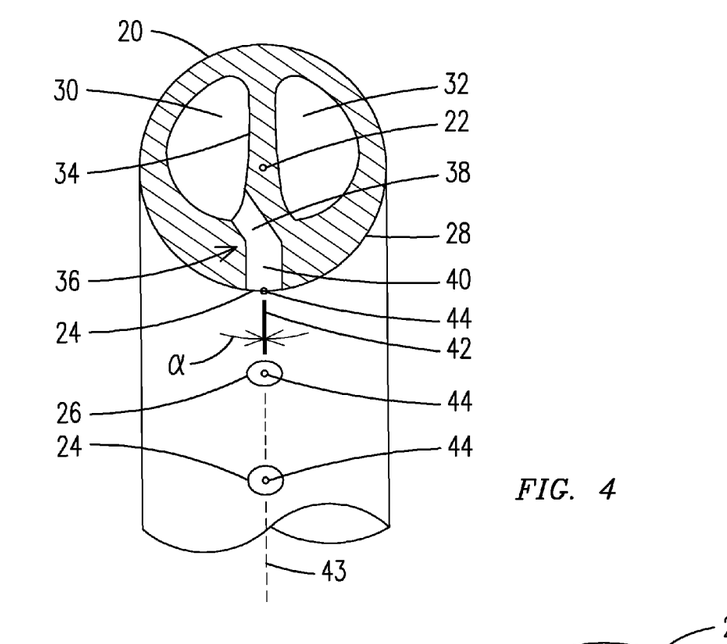
FIG. 4 is cross section A-A of FIG. 3, showing two independent passageways and a fluid outlet leading from one of the independent passageways.

FIG. 4 is cross section A-A of the annular fluid distribution device 20 of FIG. 3, taken across the longitudinal axis 22, at first fluid outlet 24. A first distribution manifold 30 distributes fluid to all first fluid outlets 24. A second distribution manifold 32 distributes fluid to all second fluid outlets 26 (shown in FIG. 5). In this embodiment the first distribution manifold 30 and second distribution manifold 32 are separated by a common dividing wall 34. A first fluid outlet duct 36 connects the first distribution manifold 30 to a first fluid outlet 24. The first fluid outlet duct 36 may be made of a first fluid outlet duct inner section 38, and a first fluid outlet duct outer portion 40, where the first fluid outlet duct inner section 38 permits fluid to travel from the first distribution manifold 30 to the first fluid outlet duct outer section 40, which in turn permits fluid communication to the first fluid outlet 24.

The centers 44 of the first fluid outlets 24 and the second fluid outlets 26 reside essentially on a common outlet plane, depicted by line 43. A fluid traveling through the first fluid outlet duct outer portion 40 takes the shape of the first fluid outlet duct outer portion 40 through which it is traveling, and is characterized by a first fluid flow longitudinal axis 42 at the moment it passes through the center 44 of the first fluid outlet 24. It is understood that the direction of the flow will subsequently change as the fluid is redirected by the gaseous flow into which it is injected. In this embodiment the first fluid outlet longitudinal axis 42 is depicted as being parallel to the fluid outlet plane 43, and thus the outlet angle α between the first fluid flow longitudinal axis 42, and common outlet plane 43, is zero for every outlet 24. However, a multitude of outlet angles α may be employed, depending on the requirements, and all angles are intended to be within the scope of this invention. Further, outlet angle α may vary from one first fluid outlet 24 to another first fluid outlet 24.

Figure 5:
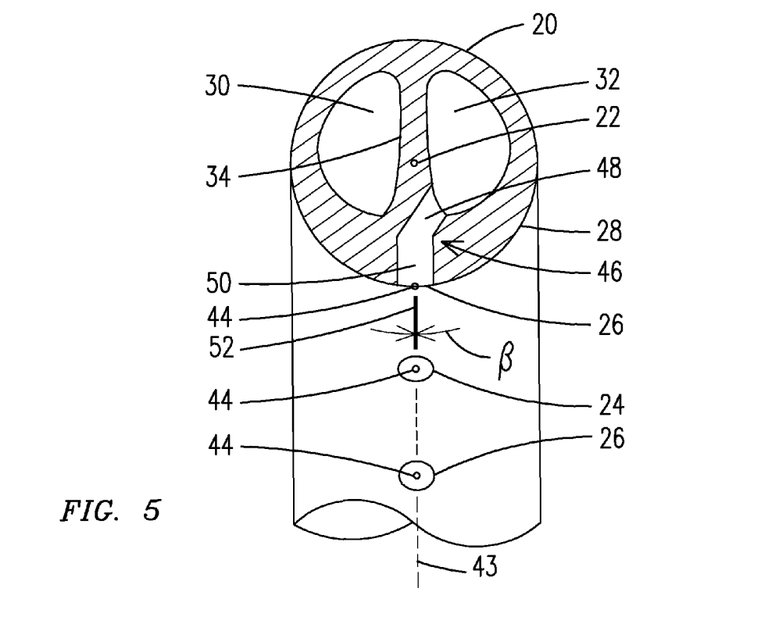
FIG. 5 is cross section B-B of FIG. 3, showing two independent passageways and a fluid outlet leading from another independent passageway.

FIG. 5 is a cross section at B-B of the annular fluid distribution device 20 of FIG. 3, taken across the longitudinal axis 22, at second fluid outlet 26. A first distribution manifold 30 distributes fluid to all first fluid outlets 26 (as discussed above). A second distribution manifold 32 distributes fluid to all second fluid outlets 26. Common dividing wall 34 separates the first distribution manifold 30 and the second distribution manifold 32. The second fluid outlet 26 may comprise a second fluid outlet duct 46 that connects the second distribution manifold 32 to a second fluid outlet 26. The second fluid outlet duct 46 may be made of a second fluid outlet duct inner section 48, and a second fluid outlet duct outer portion 50, where the second fluid outlet duct inner section 48 permits fluid to travel from the second distribution manifold 32 to the second fluid outlet duct outer section 50, which in turn permits fluid communication to the second fluid outlet 26.

A fluid traveling through the second fluid outlet duct outer portion 50 takes the shape of the second fluid outlet duct outer portion 50 through which it is traveling, and is characterized by a second fluid flow longitudinal axis 52 at the moment it passes through the center 44 of the second fluid outlet 24. In this embodiment the second fluid outlet longitudinal axis 52 is depicted as being parallel to a fluid outlet plane 42, and thus the outlet angle β between the second fluid flow longitudinal axis 52, and common outlet plane 43, is zero for every outlet 24. However, a multitude of outlet angles β may be employed, depending on the requirements, and all angles are intended to be within the scope of this invention. Further, outlet angle β may vary from one second fluid outlet 26 to another second fluid outlet 26.

The annular fluid distribution device 20 embodiment depicted in the figures shows two distribution manifolds. However, the inventors recognize that more than two distribution manifolds could be used, and annular fluid distribution devices with any number of distribution manifolds are envisioned, and intended to be within the scope of this disclosure, so long as there are at least two distribution manifolds.

In a less uniform embodiment, the inventors envision an annular fluid distribution device 20 where all centers 44 are on the common outlet plane 43. This leaves open the possibility that every outlet angle, whether α or β, is unique in the fluid distribution device 20. Embodiments grow more uniform on the other end of the scale as the number of common outlet angles, whether α or β, grows. For example, if two first outlet angles α are the same, and all other outlet angles, whether α or β are different, then the outlet angles are more uniform. An even more uniform embodiment may provide for all first outlet angles α to be the same. As uniformity grows, an embodiment may provide for all first outlet angles α to be the same, and all second outlet angles β to be the same, though α and β may be different. The most uniform embodiment would provide for all outlet angles, α and β to be the same.

In addition, in the embodiment shown it can be seen that the first fluid outlet longitudinal axes 42 and the second fluid outlet longitudinal axes 52 may merge at a common point 54 (see FIG. 3). However, the present inventors envision a variety of embodiments. On the less uniform end are embodiments with no common point, such that each longitudinal axes 42, 52, intersects no other longitudinal axis 42, 52. There may be one common point 54, where less than of all the longitudinal axes 42, 52 intersect. For example, there may be a common point where only two longitudinal axes intersect, and the rest of the longitudinal axes 42, 52, intersect no other longitudinal axis 42, 52. Embodiments may have multiple common points with varying number of longitudinal axes 42, 52 involved. For example, there may be two (or more) common points with two (or more) longitudinal axes 42, 52 per point, leaving the remaining axes 42, 52, free of any common points. A very uniform embodiment, such as that depicted in the figures, depicts one common point 52, where all axes 42, 52 intersect. Finally, this common point 52 may be within the common outlet plane 43, as depicted in the figures. The common point 54 may be at the center of the annular fluid distribution device 20 as is depicted in the figures, or it may not be at the center, while still being in the common outlet plane 43. The common point 54 may also not be disposed in the common outlet plane 43, but may be at a point in the gaseous flow upstream or downstream of the common outlet plane 43, and may or may not coincide with the center of the annular fluid distribution device 20.

The fluid outlets themselves can be disposed in an alternating pattern, (i.e. 24, 26, 24, 26 etc), or may be otherwise grouped. For example, there may be several first fluid outlets in order, and then several second fluid outlets in order, (i.e. 24, 24, 24, 24, 26, 26, 26, 26). Any number of patterns of outlets is possible, and all are intended to be within the scope of this invention.

Further, any outlet angle is acceptable so long as it can be manufactured. For example, the outlet angle may inject the fluid into and against the gaseous flow direction, at any angle. It may inject the fluid into and with the gaseous flow direction, at any angle. Finally, it may inject the fluid into the gaseous flow perpendicular to the gaseous flow direction. Also, it is envisioned that some not all outlets inject fluid with, against, or perpendicular to the flow. For example, if the annular fluid distribution device 20 is not disposed perpendicular to the flow, but all longitudinal axes 42, 52, point to a common point in the common outlet plane 43, then some outlets may inject the fluid into and against the gaseous flow direction, some may inject the fluid into and with the gaseous flow direction, and some may inject the fluid perpendicular to the gaseous flow direction. Even more variations can be envisioned when the longitudinal axes 42, 52 do not point to a common point, such that each axis could inject into the gaseous flow at an angle different than all other axes, and all such embodiments are intended to be within the scope of the invention.

As a result of the range of configurations available, it is clear that the depth of penetration of the first fluids into the gaseous fluid can be controlled independently, as can the depth of penetration of the second fluids into the gaseous fluid, using this annular fluid distribution device. The amount of penetration of the first fluid into the gaseous fluid determines where the first fluid will be disposed once the first fluid arrives at the combustor, and likewise with the second fluid. Thus, the annular fluid distribution device 20 can be designed to direct the fluids such that they will arrive at a desired location in the downstream combustor. In particular, the annular fluid distribution device 20 can be designed to direct the fluids to burners disposed in the combustor.

For a given location and orientation of the fuel ring, the depth of penetration can be controlled on a per-outlet basis by configuring the angle α, β of the fluid outlet 24, 26, the outlet diameter, and the pressure in the manifold 30, 33. For example, it can be seen in FIGS. 4 and 5 that a diameter of the first fluid outlet 24 is different than the diameter of the second fluid outlet 26. As a result, given equal flow rates into the manifolds, first fluid exiting the first fluid outlet 24 would penetrate further into the gaseous flow than would a second fluid exiting from the second fluid outlet 26. Another example would include increasing the pressure in one manifold over another, while keeping the diameters of the first fluid outlets 24 and second fluid outlets 26 the same. A final example could vary both the pressure in the manifolds as well as the outlet configurations.

Depth of penetration can also be controlled by group. For instance, groups of first fluid outlets may be configured together, and likewise with second fluid outlets. The embodiment depicted in the figures, where all α and β angles are zero, and there is a common point in common outlet plane 43 at the center of the annular fluid distribution device 20, has proven to be especially advantageous to the inventors. As discussed in more detail below, such a configuration permits the first fluid from all first fluid outlets 24 to penetrate the gaseous flow a first depth, and the second fluid from all second fluid outlets 26 to penetrate the gaseous fluid a second different depth, all without the gaseous fluid seeing any new or changed structure from prior fuel ring configurations, and because there is no additional structure, there is advantageously no additional disturbance to the gaseous fluid flow.

The inventive design further permits a great deal of flexibility in the design and operation of the gas turbine engine. For example, several different types of fluids can be injected into the gaseous fluid using this annular fluid distribution device. Fuel can be used, oil can be used, and steam can be used. Further, it is possible to use one fluid in the first distribution manifold 30, and a different fluid in the second distribution manifold 32. For example, when transitioning from fuel to oil, an operator could leave fuel in the first distribution manifold 30, and transition the fluid in the second distribution manifold 32 from fuel to oil. As a result there would be a steady supply of fuel to the burners from the first fluid outlets 24, while the fluid from the second fluid outlets 26 gradually transitions from fuel to oil. Then the fuel in the first distribution manifold 30 could likewise be transitioned from fuel to oil, such that the burners would, from beginning to end, see a gradual transition from fuel to oil. Even finer control of the transition is possible by controlling the pressure of the fluid in a manifold as the oil is introduced, for example, from low to high, such that the introduction of oil into the gaseous fluid is even more gradual. Other fluids, such as steam, could also be injected into the gaseous flow using this annular fluid distribution device.

By varying the pressure and/or the fluid outlets themselves, the amount of penetration of the fluid into the gaseous stream can be controlled. The pressure ratios will determine the radial biasing of the fuel in the gaseous flow. For example, under relatively lower pressure, the fuel penetration may be limited, resulting in a rich mixture of fuel at locations radially outward in the gaseous flow, and a lean mixture at locations radially inward in the gaseous flow. Conversely, with higher relative pressures, fuel penetration into the gaseous stream can be increased, resulting in a richer mixture radially inward in the gaseous flow, and a lean mixture radially outward in the gaseous flow. Each group can be independently controlled, such that one group may penetrate the gaseous fluid further than another group.

As also noted earlier, the fluid outlets may alternate, or may be grouped in any number of patterns. The pattern chosen will determine the circumferential biasing of the fuel in the gaseous flow. For example, several first fluid outlets may be grouped together, and the pressure in the first fluid manifold may be increased. As a result, more of the first fluid would be delivered to the gaseous fluid in the region of the first fluid outlets than would be delivered to the gaseous flow in the region of the second fluid outlets. This circumferential biasing, together with the radial fuel biasing permitted by this invention, allow control of the fuel profile in the gaseous flow to an extent not possible before.

Figure 6:
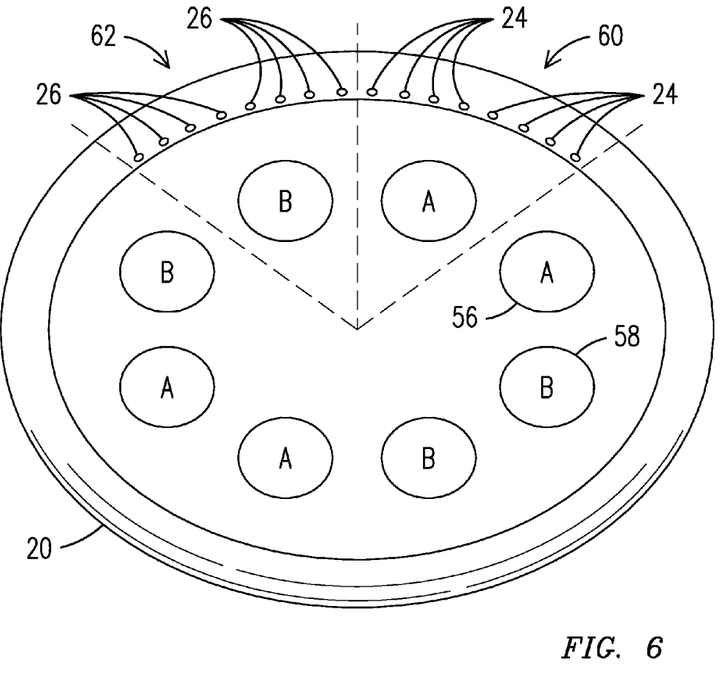
FIG. 6 is a schematic view that depicts how outlets of the fuel ring of the present invention may be positioned to deliver fuel to associated burners.

The inventors recognize advantages of several possible configurations of radial and circumferential biasing. Alternating the outlets and, for example, and varying the pressure in the manifolds, may result in a highly homogenous fuel profile in the gaseous flow. FIG. 6 depicts a highly schematic view of a combustor configuration that specifically benefits from grouping several outlets from the same manifold together. In a combustor where, for example, burners are downstream in the gaseous fluid from the annular distribution ring, are grouped into stages, and disposed at the same radial distance from the combustor's longitudinal axis, for example stage A burners 56, and stage B burners 58, a number of first fluid outlets 24 can be grouped together into a first outlet group 60 and positioned in the gaseous flow upstream of the stage A burners 56, and a number of second fluid outlets 26 can be grouped together into a second outlet group 62 and positioned in the gaseous flow upstream of the stage B burners 58. There may be as many first fluid outlet groups 60 as there are stage A burners 56, and each first fluid outlet group 60 may be associated with a specific stage A burner 56. Likewise, there may be as many second fluid outlet groups 62 as there are stage B burners 58, and each second fluid outlet group 62 may be associated with a specific stage A burner 58. By positioning of the groups the inventors mean positioning of the outlet groups in whatever location is necessary in the gaseous flow to result in the fluid from an outlet group reaching the burner associated with that group. Such a location may require longitudinal and circumferential adjustment, so long as there is communication of the fluid between the fluid outlets and the burner associated with that outlet group.

As a result, fluid exiting from first fluid outlet groups 60 would enter the gaseous flow and be carried in the gaseous flow until the fluid reaches the stage A burners 56. Likewise, fluid exiting from second fluid outlet groups 62 would enter the gaseous flow and be carried in the gaseous flow until the fluid reaches stage B burners 58. This way, the desired amount of fluid in the gaseous airflow, i.e. the premix ratio, can be tailored per stage of burners. This improved tailoring of the fuel profile greatly improves the designer's and operator's ability to reduce NOx emissions and combustion dynamics. The inventors envision that an annular fluid distribution device with more outlet manifolds could be configured to tailor the amount of fluid delivered to more downstream burner stages, or to individual burners within a stage. All such variations are meant to be within the scope of this invention.

In another embodiment, if downstream burners are not disposed at the same radial distance from the combustor longitudinal axis, first outlet groups may be configured to deliver first fluids to the outer burners, while second outlet groups may be configured to deliver second fluids to the inner burners. This may be accomplished by increasing the pressure in the second manifold over the pressure in the first manifold, thereby increasing the penetration of the second fluids into the gaseous flow, such that they will reach the inner burners. The inventors envision groups being configured to deliver fluids to any number of burners at any number or radial distances from the combustor's longitudinal axis. All such variations are meant to be within the scope of this invention.

Figure 7:
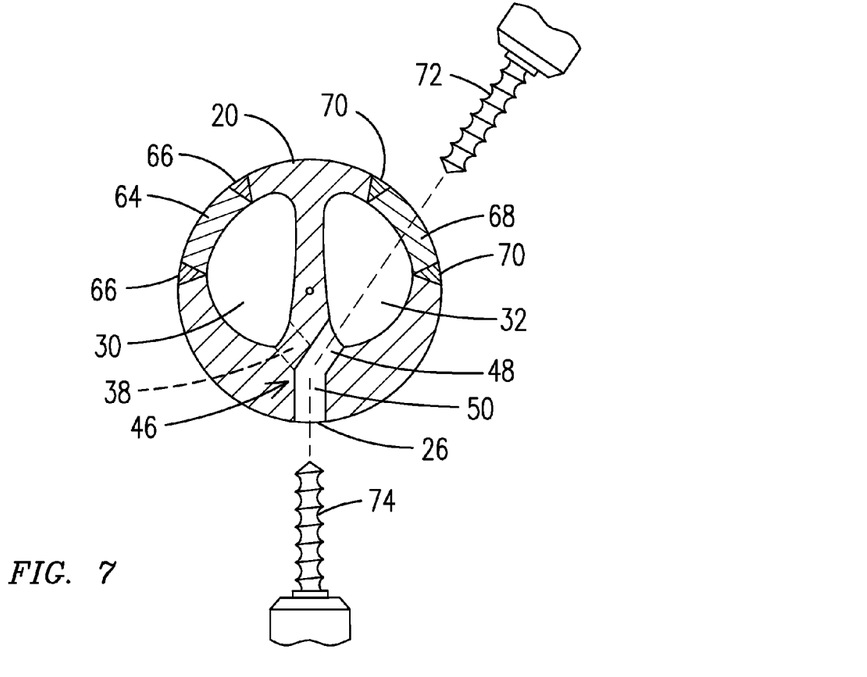
FIG. 7 is a cross section of a fuel ring depicting annular covers.
Figure 8:
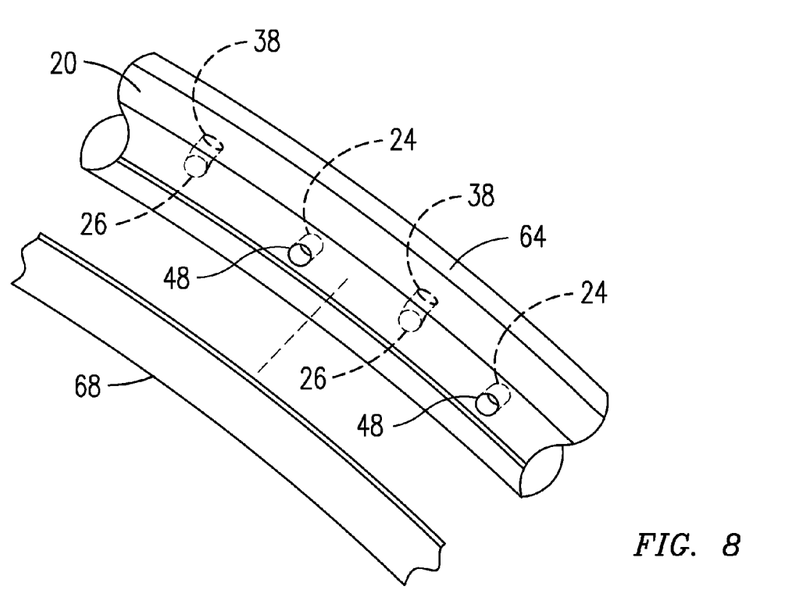
FIG. 8 is a side view of a fuel ring showing an annular cover.

The inventors of the annular fluid distribution ring 20 have also innovatively devised at least two different ways in which the embodiment in the figures can be manufactured. In one embodiment, shown in FIG. 7, the first distribution manifold 30 is formed in part by a first distribution manifold cover 64 which is welded in place with welds 66. Likewise, the second distribution manifold 32 is formed in part by a second distribution manifold cover 68. The covers are one-piece, annular covers, and are installed after the fluid outlet duct inner sections 38, 48 are drilled. In an inner duct drilling operation 72, the drilling operation 72 forms the fluid outlet duct inner sections 38, 48, and then the distribution manifold covers 64, 68 are welded into place. Fluid outlet duct outer section 40, 50 may be formed by an outer duct drilling operation 74. This can occur before or after the inner duct drilling operation 72. FIG. 8 shows manifold cover 64 as positioned in the annular fluid distribution ring 20, and manifold cover 68 prior to being welded into position in the annular fluid distribution ring 20.

Figure 9:
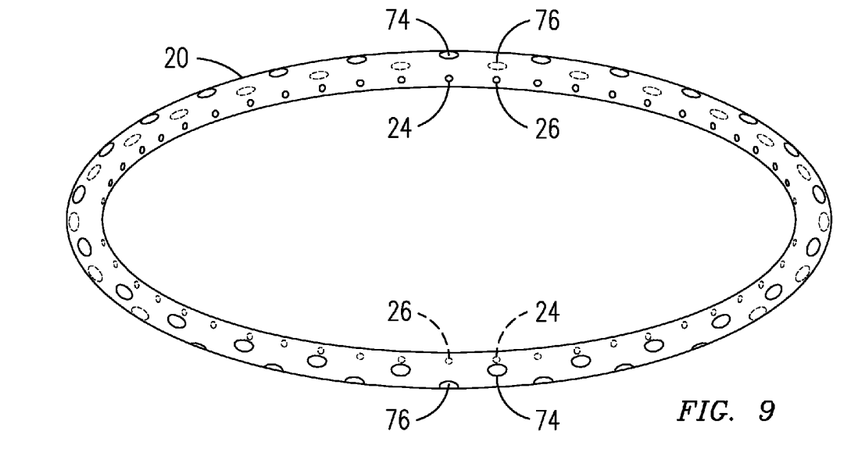
FIG. 9 is a side view of a fuel ring showing a cover for each fluid outlet.
Figure 10:
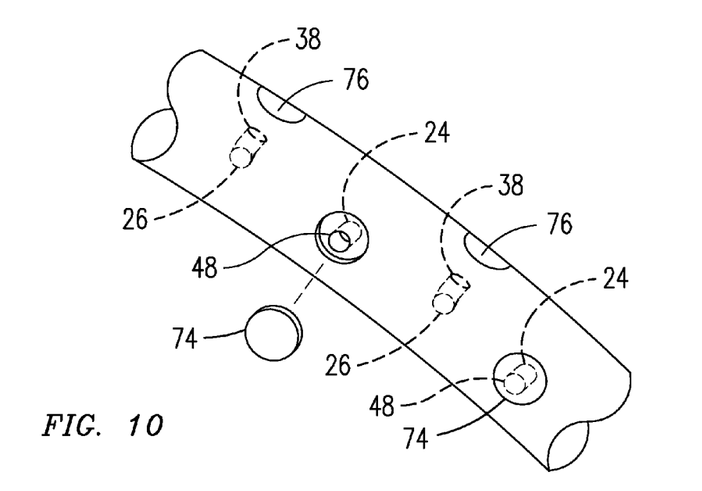
FIG. 10 is a partial side elevational view of the embodiment of FIG. 9.

In an alternate embodiment, shown in FIG. 9, each fluid outlet 24, 26, may have a discrete cover associated with it. For example, a first fluid outlet 24 may have a first fluid outlet cover 74 associated with it. The cover may be a separate piece of circular material. When the first fluid outlet cover 74 is not in place, as shown in FIG. 9, an inner duct drilling operation 72 can be performed, because the drilling operation can access the interior of the fluid distribution chambers 30, 32, as can be seen in FIG. 10. After the inner duct drilling operation 72, the first fluid outlet cover 74 is welded into place, as also shown in FIG. 9. Likewise, a second fluid outlet 26 may have a second fluid outlet cover 76 associated with it, which may be welded into place once the inner duct drilling operation 72 is performed. In yet another embodiment, the inner duct drilling operation 72 may be performed through the annular fluid distribution ring 20 wall, and the remaining hole may be covered (i.e. filled) by weld material (not shown).

The inventors have innovatively devised an annular structure that permits circumferential and radial biasing of fuel flow into a gaseous fluid, thus permitting a wide variety of fuel profiles in the gaseous fluid not seen in the prior art annular structures. With this greater flexibility comes reduced NOx emissions, and greater control of combustion, resulting in fewer combustion instabilities. All this can be accomplished using an annular fluid distribution device that is relatively simple and inexpensive to manufacture, given the greatly improved control and flexibility resulting from its use.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An annular fluid distribution device for distributing fluid into a gaseous flow comprising:
    a first fluid distribution manifold comprising a first fluid inlet, first fluid outlets, and an annular shaped first passageway providing fluid communication between the first fluid inlet and the first fluid outlets, wherein the first fluid outlets inject a first fluid into the gaseous flow;
    a second fluid distribution manifold, comprising a second fluid inlet, second fluid outlets, and an annular shaped second passageway providing fluid communication between the second fluid inlet and the second fluid outlets, wherein the second fluid outlets inject a second fluid into the gaseous flow, and wherein the second fluid distribution manifold is isolated from the first fluid distribution manifold within the annular fluid distribution device,
    wherein the first fluid outlets and the second fluid outlets are disposed on a common fluid outlet plane.

2. The annular fluid distribution device of claim 1, wherein the first fluid outlets and the second fluid outlets inject fluid at a common angle with respect to the common fluid outlet plane.

3. The annular fluid distribution device of claim 1, wherein first fluid outlet vectors and second fluid outlet vectors converge at a common convergence point.

4. The annular fluid distribution device of claim 2, wherein the common angle with respect to the common fluid outlet plane is zero.

5. The annular fluid distribution device of claim 4, wherein first fluid outlet vectors and second fluid outlet vectors converge at a convergence point, and the convergence point is in the common fluid outlet plane.

6. The annular fluid distribution device of claim 2, wherein the first fluid outlets are grouped to inject the first fluid at locations that correspond to first stage burner locations in a combustor, and the second fluid outlets are grouped to inject the second fluid at locations that correspond to second stage burner locations in the combustor, such that the gaseous flow delivers fluid from respective outlets to respective burners.

7. The gas turbine combustor of claim 1, wherein the fluid distribution passageways are separated by a common dividing wall.

8. The gas turbine combustor of claim 1, wherein each outlet has a cover, and each cover defines a portion of independent passageways.

9. The gas turbine combustor of claim 1, wherein each independent passageway comprises an annular cover, and wherein each annular cover is welded into place.

10. A gas turbine combustor comprising an annular fluid distribution device for distributing fluid into a gaseous flow, the annular fluid distribution device comprising a plurality of independent and annular-shaped passageways, wherein each passageway comprises an inlet and a plurality of outlets, and wherein all outlets are disposed on a common fluid outlet plane.

11. The gas turbine combustor of claim 10, wherein the fluid outlets inject fluid at a same angle with respect to the common fluid outlet plane.

12. The gas turbine combustor of claim 10, wherein first fluid outlet vectors and second fluid outlet vectors converge at a common convergence point.

13. The gas turbine combustor of claim 11, wherein the same angle with respect to the common fluid outlet plane is zero.

14. The gas turbine combustor of claim 13, wherein first fluid outlet vectors and second fluid outlet vectors converge at a convergence point, and the convergence point is in the common fluid outlet plane.

15. The gas turbine combustor of claim 10, wherein the plurality of outlets of each independent passageway is disposed in a position upstream of and corresponding to an associated burner, such that the fluid from respective independent passageways reaches a respective associated burner.

16. The gas turbine combustor of claim 10, wherein each outlet has a cover, and each cover defines a portion of the respective independent passageway.

17. The gas turbine combustor of claim 10, wherein each independent passageway is partially defined by an annular cover.

18. A gas distribution device comprising:
- an annular fuel ring comprising a tubular outer wall;
- a dividing wall within the annular fuel ring and defining two independent annular fuel passageways;
- a fuel inlet in fluid communication with each respective fuel passageway;
- a first plurality of fluid outlet ducts passing through the tubular outer wall and intersecting a first of the fuel passageways for delivering fuel from the first fuel passageway to a respective plurality of first fuel outlets;
- a second plurality of fluid outlet ducts passing through the tubular outer wall and intersecting a second of the fuel passageways for delivering fuel from the second fuel passageway to a respective plurality of second fuel outlets;
- wherein all of the fuel outlets are disposed on a common fuel outlet plane.

19. The gas distribution device of claim 18, wherein outlet angles of fuel exiting all outlets is zero with respect to the common fuel outlet plane.

20. The gas distribution device of claim 18, wherein each fuel passageway is partially formed by a respective cover and each cover is disposed on a side of the respective fuel passageway opposite the fluid outlet ducts.

* * * * *